United States Patent
Lee et al.

(10) Patent No.: US 10,976,151 B2
(45) Date of Patent: Apr. 13, 2021

(54) OPTICAL INTERFEROMETER WITH REFERENCE ARM LONGER THAN SAMPLE ARM

(71) Applicant: INDUSTRIAL TECHNOLOGY RESEARCH INSTITUTE, Hsinchu (TW)

(72) Inventors: Yuan Chin Lee, Hsinchu (TW); Ting Wei Chang, New Taipei (TW); Chi Shen Chang, Hsinchu County (TW); Chy Lin Wang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 125 days.

(21) Appl. No.: 16/232,689

(22) Filed: Dec. 26, 2018

(65) Prior Publication Data
US 2020/0208959 A1  Jul. 2, 2020

(51) Int. Cl.
*G01B 9/02* (2006.01)
*G02B 27/12* (2006.01)

(52) U.S. Cl.
CPC ..... *G01B 9/02015* (2013.01); *G01B 9/02091* (2013.01); *G02B 27/123* (2013.01)

(58) Field of Classification Search
CPC ............ G01B 9/02015; G01B 9/02091; G01B 11/04; G01B 9/02051; G02B 27/123
See application file for complete search history.

(56) References Cited

U.S. PATENT DOCUMENTS 6,924,897 B2 * 8/2005 Parks ................... G02B 21/00
356/508
7,050,171 B1  5/2006 Banerjee et al.
(Continued)

FOREIGN PATENT DOCUMENTS

CN   101166946 A   4/2008
CN   101782368 A   7/2010
(Continued)

OTHER PUBLICATIONS

Arnaud Dubois et al., High-resolution full-field optical coherence tomography with a Linnik microscope, Applied Optics, 2002, vol. 41, No. 4.
(Continued)

*Primary Examiner* — Hwa Andrew Lee
(74) *Attorney, Agent, or Firm* — Locke Lord LLP; Tim Tingkang Xia, Esq.

(57) ABSTRACT

An optical interferometer includes a beam splitter module and an optical sensor. The beam splitter module includes a lens assembly and a splitter cube. A light incident surface of the splitter cube is substantially orthogonal to an optical axis of the lens assembly. An acute angle is between the light incident surface and a light splitting surface of the splitter cube. A sampling surface of the splitter cube is substantially parallel to the light incident surface. A light reflecting surface of the splitter cube is substantially orthogonal to the light incident surface. The light incident surface is closer to the lens assembly than the sampling surface. A reference arm is defined between a splitter position on the light splitting surface and the light reflecting surface, a sample arm is defined between the splitter position and the sampling surface, and the reference arm is longer than the sample arm.

16 Claims, 8 Drawing Sheets

(56) References Cited

U.S. PATENT DOCUMENTS

| | | | |
|---|---|---|---|
| 7,768,629 B2 | 8/2010 | Typpo et al. | |
| 7,918,791 B2 | 4/2011 | Lu et al. | |
| 8,493,657 B2 | 7/2013 | Huang | |
| 8,873,034 B2 | 10/2014 | Lin et al. | |
| 8,894,206 B2 | 11/2014 | Lee et al. | |
| 9,007,572 B2 | 4/2015 | Eckman et al. | |
| 9,910,256 B2 | 3/2018 | Shaked et al. | |
| 2003/0035119 A1* | 2/2003 | Myatt | G01J 9/0246 356/519 |
| 2007/0035744 A1* | 2/2007 | Lehmann | G01B 11/2441 356/512 |
| 2007/0139647 A1 | 6/2007 | Ophey | |
| 2007/0215798 A1* | 9/2007 | Kauppinen | H04R 23/008 250/231.1 |
| 2007/0238955 A1* | 10/2007 | Tearney | A61B 1/00167 600/407 |
| 2008/0198388 A1* | 8/2008 | Kranz | G01N 21/31 356/521 |
| 2012/0038885 A1 | 2/2012 | Cense et al. | |
| 2015/0109623 A1* | 4/2015 | Abdulhalm | G01B 9/02083 356/479 |
| 2016/0341538 A1 | 11/2016 | Tumlinson et al. | |
| 2017/0193659 A1 | 7/2017 | Wang et al. | |
| 2018/0017371 A1* | 1/2018 | Yamauchi | G02B 21/06 |

FOREIGN PATENT DOCUMENTS

| | | |
|---|---|---|
| TW | 201014571 A | 4/2010 |
| TW | I331211 B | 10/2010 |
| TW | I385598 B1 | 2/2013 |
| TW | I639809 B | 11/2018 |
| WO | 2018136993 A1 | 8/2018 |

OTHER PUBLICATIONS

Kate Grieve et al., In vivo anterior segment imaging in the rat eye with high speed white light full-field optical coherence tomography, Optics Express, 2005, vol. 13, No. 16.

L. Vabre et al., Thermal-light full-field optical coherence tomography, Optical Society of America, 2002.

Antoine Federici et al., Three-band, 1.9-μm axial resolution fullfield optical coherence microscopy over a 530-1700 nm wavelength range using a single camera, Optical Society of America, 2014.

Arnaud Dubois et al., Ultrahigh-resolution full-field optical coherence tomography, Applied Optics, 2004, vol. 43, No. 14.

* cited by examiner

OPTICAL INTERFEROMETER WITH REFERENCE ARM LONGER THAN SAMPLE ARM

BACKGROUND

1. Technical Field

This present disclosure relates to an optical interferometer.

2. Related Art

Optical coherence tomography (OCT) is an optical imaging technique that measures scattered light generated by light entering into a substance or a biological tissue. Compared with other non-invasive measurement techniques (such as ultrasound), optical coherence tomography has an excellent spatial resolution for clear image information. The OCT is implemented by a Michelson interferometer. When light travels into the beam splitter, two splitting light rays used for interference travel along the reference arm and the sample arm, respectively, to cause interference at an optical sensor. The reference arm is a light ray reflected by a planar mirror, and the sample arm is a light ray reflected by a scanned cross-section of a sample at a certain depth or a surface of the sample. The OCT has been widely used in various medical fields, such as ophthalmology, oral surgery, dentistry, gastroenterology (with endoscopy) and so on.

In the OCT devices, the optical interferometer includes a reference arm and a sample arm. However, such configuration is difficult to reduce the size of the optical interferometer. Thus, it is unfavorable for the miniaturization and portable development of the OCT devices. In addition, the quantity of the optical components inside the optical interferometer is excessive, and thus the manufacturing cost is relatively high.

SUMMARY

According to one aspect of the present disclosure, an optical interferometer includes a beam splitter module and an optical sensor. The beam splitter module includes a lens assembly and a first splitter cube. The first splitter cube is disposed on a sample side of the lens assembly. The first splitter cube includes a light incident surface, a light splitting surface, a sampling surface, and a light reflecting surface. The light incident surface of the first splitter cube is substantially orthogonal to an optical axis of the lens assembly. An acute angle is between the light incident surface and the light splitting surface of the first splitter cube. The sampling surface of the first splitter cube is substantially parallel to the light incident surface. The light reflecting surface of the first splitter cube is substantially orthogonal to the light incident surface. The light incident surface is closer to the lens assembly than the sampling surface. The optical sensor is disposed on a signal receiving side of the lens assembly. A reference arm is defined between a splitter position on the light splitting surface and the light reflecting surface. A sample arm is defined between the splitter position and the sampling surface, and the reference arm is longer than the sample arm.

According to another aspect of the present disclosure, an optical interferometer includes a beam splitter module, an index matching component and an optical sensor. The beam splitter module includes a first splitter cube, a lens assembly, and a second splitter cube. The first splitter cube includes a light incident surface, a light splitting surface, a sampling surface, and a light reflecting surface. An acute angle is between a light incident surface and a light splitting surface of the first splitter cube. A sampling surface of the first splitter cube is substantially parallel to the light incident surface, and a light reflecting surface of the first splitter cube is substantially orthogonal to the light incident surface. The lens assembly includes a focusing objective lens and a tube lens which are arranged along an optical axis of the lens assembly. The light incident surface of the first splitter cube faces the focusing objective lens, and the light incident surface is substantially orthogonal to the optical axis. The tube lens is disposed between the focusing objective lens and the second splitter cube. The first splitter cube is disposed between the index matching component and the focusing objective lens. The second splitter cube is disposed between the optical sensor and the tube lens.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
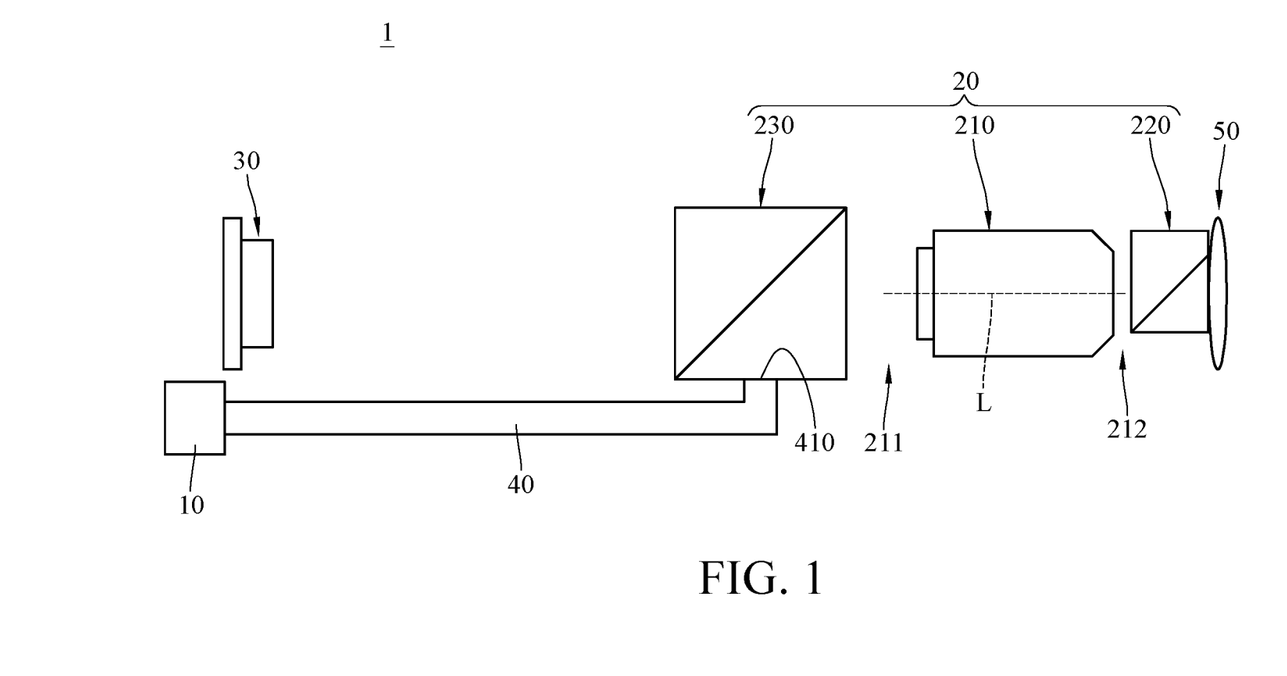
FIG. 1 is a schematic view of an optical interferometer according to one embodiment of the present disclosure.
Figure 2:
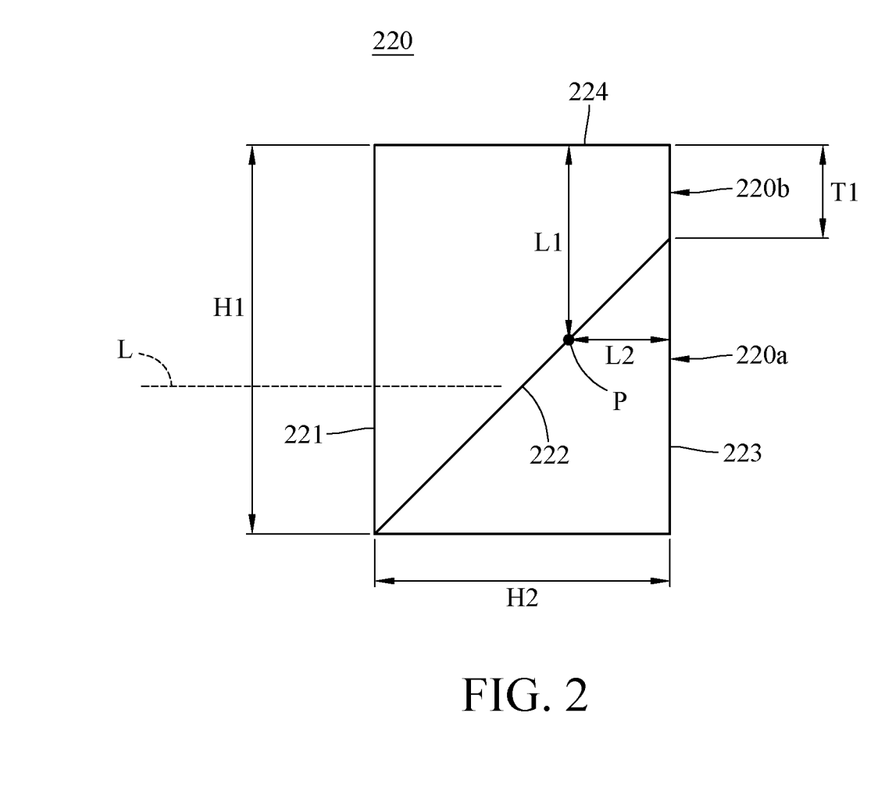
FIG. 2 is a schematic view of a first splitter cube of the optical interferometer in FIG. 1.

According to one embodiment of the present disclosure, an optical interferometer 1 includes a beam splitter module 20 and an optical sensor 30. Please refer to FIG. 1 and FIG. 2. FIG. 1 is a schematic view of an optical interferometer 1 according to one embodiment of the present disclosure. FIG. 2 is a schematic view of a first splitter cube 220 of the optical interferometer 1 in FIG. 1. The optical interferometer 1, for example, but not limited to, is a Michelson interferometer including a light source 10, a beam splitter module 20 and an optical sensor 30.

The light source 10, for example, but not limited to, is a near infrared lamp with a wavelength from 700 nm to 1300 nm. The beam splitter module 20 includes a lens assembly 210 and a first splitter cube 220. The lens assembly 210 includes one or more lens elements, and the lens assembly 210 has a signal receiving side 211 and a sample side 212 opposite to each other.

As shown in FIG. 1, the first splitter cube 220 is disposed on the sample side 212 of the lens assembly 210. As shown in FIG. 2, the first splitter cube 220 has a light incident surface 221, a light splitting surface 222, a sampling surface 223 and a light reflecting surface 224. The light incident surface 221 is substantially orthogonal to an optical axis L of the lens assembly 210. There is an acute angle between the light splitting surface 222 and the light incident surface 221. The sampling surface 223 is substantially parallel to the light incident surface 221, and the light reflecting surface 224 is substantially orthogonal to the light incident surface 221. The light incident surface 221 is closer to the lens assembly 210 than the sampling surface 223.

As shown in FIG. 1, the optical sensor 30, for example, but not limited to, is a complementary metal oxide semiconductor (CMOS) or a charge coupled device (CCD) disposed on the signal receiving side 211 of the lens assembly 210. The optical sensor 30 can receive light rays, which travel from the sample side 212 to the signal receiving side 211, that pass through of the lens assembly 210.

According to one embodiment of the present disclosure, as shown in FIG. 2, the first splitter cube 220 includes a triangular prism 220a and a trapezoidal prism 220b connected with each other. The triangular prism 220a and the trapezoidal prism 220b jointly form the light splitting surface 222, wherein the bottom surface of the triangular prism 220a contacts the side surface of the trapezoidal prism 220b. The triangular prism 220a has the sampling surface 223, and the trapezoidal prism 220b has the light incident surface 221 and the light reflecting surface 224. In detail, the light incident surface 221 is the basal surface of the trapezoidal prism 220b. The light reflecting surface 224 is a height surface of the trapezoidal prism 220b, and the sampling surface 223 is one of the side surfaces of the triangular prism 220a. The height H1 of the light incident surface 221 is greater than the thickness H2 of the first splitter cube 220, and a sum of the thickness H2 and the distance T1 (the distance T1 measured between the light splitting surface 222 and the light reflecting surface 224) is equal to the height H1 (that is, the condition is satisfied: T1+H2=H1). The light splitting surface 222 and the light reflecting surface 224 can be coated with a high reflective layer such as silver film. It is noted that the scope of the present disclosure is not limited to the shapes of the prisms 220a, 220b in FIG. 2. In some embodiments, when the condition is satisfied: T1+H2=H1, the shape of the prism is selectable.

According to one embodiment of the present disclosure, a reference arm L1 of the first splitter cube 220 is longer than a sample arm L2 of the first splitter cube 220. As shown in FIG. 2, a splitter position P on the light splitting surface 222 of the first splitter cube 220 is a position where light incident from the light incident surface 221 into the first splitter cube 220 splits into two different light rays. When light reaches the splitter position P, some light rays are reflected by the light splitting surface 222 so as to travel toward the light reflecting surface 224. Some light rays pass through the light splitting surface 222 so as to travel toward the sampling surface 223. The reference arm L1 is defined between the splitter position P and the light reflecting surface 224, and the sample arm L2 is defined between the splitter position P and the sampling surface 223. The reference arm L1 is longer than the sample arm L2 (L1>L2). The splitter position P can be any point on the light splitting surface 222 where light is split, and the condition of L1>L2 is satisfied.

According to one embodiment of the present disclosure, the first splitter cube 220 is made of a material selected from the group consisting of S-FPL53 glass, quartz, S-FSL5 glass, and bk7 glass. Preferably, the first splitter cube 220 is made of S-FPL53 so as to have a proper Strehl ratio for an even distribution of light intensity, such that it is favorable for obtaining a high-quality interference image.

According to one embodiment of the present disclosure, the beam splitter module 20 further includes a second splitter cube 230. As shown in FIG. 1, the lens assembly 210 of the beam splitter module 20 includes a single lens element or a plurality of lens elements configured to focus light rays to converge light into the first splitter cube 220. Moreover, the beam splitter module 20 further includes a second splitter cube 230 disposed between the lens assembly 210 and the optical sensor 30. The lens assembly 210 is located between the first splitter cube 220 and the second splitter cube 230. Light emitted by the light source 10 travels into the second splitter cube 230 through an optical fiber 40. Light from the light source 10 is reflected by the second splitter cube 230, so that reflected light travels toward the lens assembly 210. The embodiment in FIG. 1 uses an optical fiber 40 to transmit light, but the present disclosure is not limited thereto. In some embodiments, a converging light beam directly travels into the second splitter cube 230.

In FIG. 1, the optical sensor 30 and an end facet 410 of the optical fiber 40 are located on different two sides of the second splitter cube 230, respectively. The optical sensor 30 is opposite to the lens assembly 210 of the beam splitter module 20. It is noted that the scope of the present disclosure is not limited to the above configuration. In some embodiments, positions of the optical sensor 30 and the optical fiber 40 can be interchanged with each other.

According to one embodiment of the present disclosure, the optical interferometer 1 further includes an index matching component 50. As shown in FIG. 1, the first splitter cube 220 of the beam splitter module 20 is disposed between the index matching component 50 and the lens assembly 210. The index matching component 50, for example, but not limited to, is gas, liquid or deformable substance. For example, in one embodiment, the index matching component 50 is a transparent case stuffed with glycerol or silicone oil. In another embodiment, the index matching component 50 is an air gap.

Figure 3:
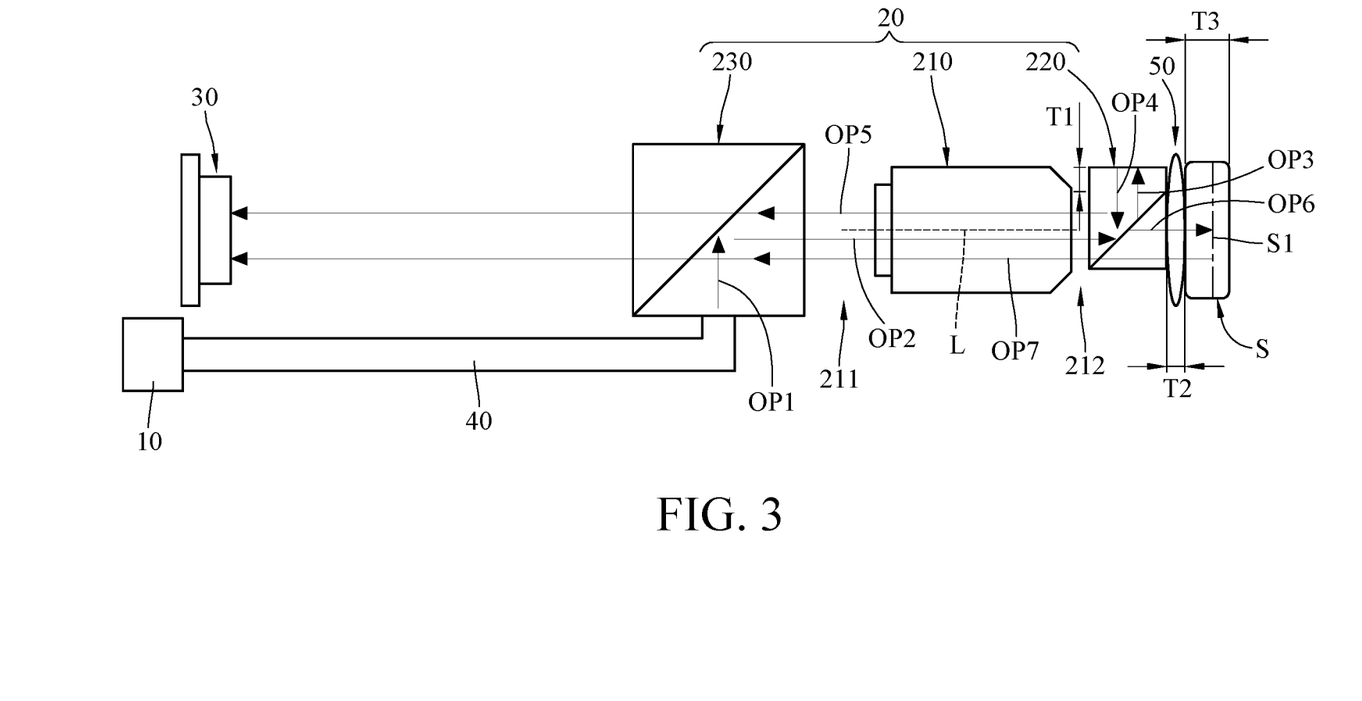
FIG. 3 is a schematic view of using the optical interferometer in FIG. 1 to scan a sample.

FIG. 3 is a schematic view of using the optical interferometer 1 in FIG. 1 to scan a sample S. The sample S to be tested is positioned at the sample side 212 of the lens assembly 210 of the beam splitter module 20. The index matching component 50 is located between the first splitter cube 220 and the sample S. The sample S, for example, but not limited to, is a biological tissue having an interference surface S1. The interference surface S1 can be the outer surface of the biological tissue or a cross-section of the biological tissue in a certain depth. In FIG. 3, the interference surface S1 is a cross-section of the biological tissue in a scannable depth from the outer surface.

Figure 4:
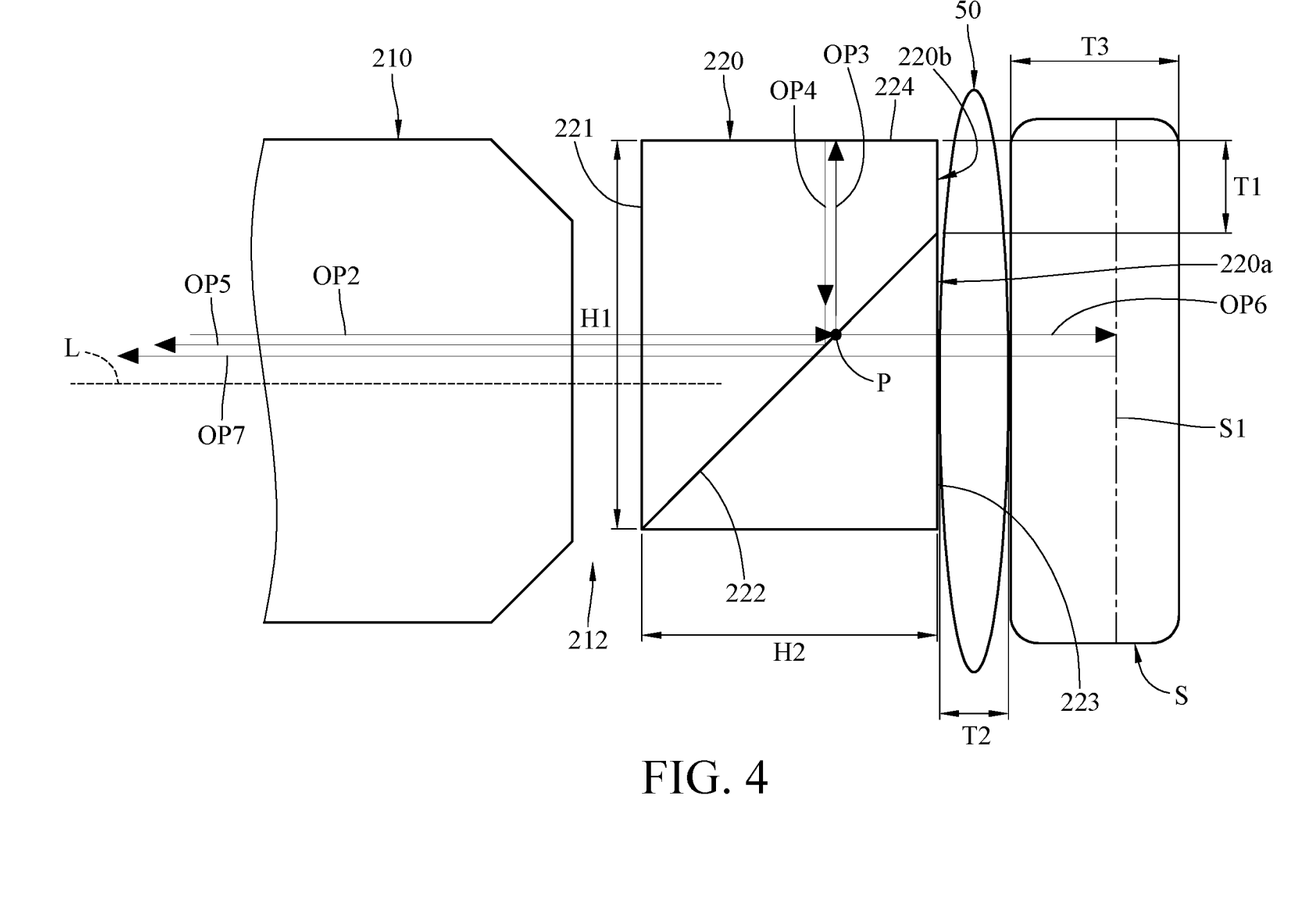
FIG. 4 is a partially enlarged view of the optical interferometer and the sample in FIG. 3.

Please refer to FIG. 2 through FIG. 4. FIG. 4 is a partially enlarged view of the optical interferometer and the sample in FIG. 3. Light emitted by the light source 10 travels through the optical fiber 40, and then the light is introduced into the second splitter cube 230 along an optical path OP1. The light is reflected by the second splitter cube 230 so as to travel toward the lens assembly 210. The light reflected by the second splitter cube 230 travels through the lens assembly 210 and the light incident surface 221 of the first splitter cube 220 along an optical path OP2, and then the light reaches the splitter position P of the light splitting surface 222. At the splitter position P, the light splits into a reference light ray (reference arm L1) reflected by the light splitting surface 222 and a sample light ray (sample arm L2) passing through the light splitting surface 222. The reference light ray reaches the light reflecting surface 224 along an optical path OP3. The reference light ray is reflected by the light reflecting surface 224 so as to travel back to the light splitting surface 222 along an optical path OP4, and then the reference light ray is reflected by the light splitting surface 222. The reference light ray reflected by the light splitting surface 222 further travels through the lens assembly 210 and the second splitter cube 230 along an optical path OP5 so as to be received by the optical sensor 30. The sample light ray travels through the sampling surface 223 and the index matching component 50 along an optical path OP6 so as to reach the interference surface S1 of the sample S. The sample light ray reflected by the interference surface S1 sequentially travels through the index matching component 50, the first splitter cube 220, the lens assembly 210 and the second splitter cube 230 along an optical path OP7 so as to be received by the optical sensor 30. The optical sensor 30 can be coupled with a computer (not shown in the drawings). The computer includes a signal processing module which generates an interference image according to the reference light ray and the sample light ray received by the optical sensor 30.

According to one embodiment of the present disclosure, when the refractive index of the first splitter cube 220 is n1, the refractive index of the index matching component 50 is n2, the refractive index of the sample S is n3, the distance between the light splitting surface 222 and the light reflecting surface 224 is T1, the thickness of the index matching component 50 is T2, and a scannable depth (a range) of the sample S is T3, and the following condition is satisfied: n1×T1=n2×T2+n3×T3. As shown in FIG. 4, the distance T1 between the light splitting surface 222 and the light reflecting surface 224 of the first splitter cube 220 is referred to as a distance from a side of the light splitting surface 222 closest to the light reflecting surface 224. That is, a minimum distance between the light splitting surface 222 and the light reflecting surface 224. The scannable depth T3 of the sample S could be equal to the thickness of the sample S, or alternatively, depends on the deepest cross-section of the sample S that the optical interferometer 1 is able to scan according to usage requirements. Therefore, during the design of the optical interferometer 1, once the material of the first splitter cube 220 and the distance T1 are determined, the scannable depth T3 of the sample S is variable by adjusting the thickness T2 of the index matching component 50. As such, all cross-sections of the sample S can be scanned by the optical interferometer 1. According to the requirements of product design and the sample S, the index matching component 50 can be properly selected, such that the thickness T2 of the index matching component 50 and the scannable depth T3 are adjusted. For example, when a thin index matching component 50 (smaller T2) is determined, the optical interferometer 1 has a larger scannable depth T3 so as to be able to scan a thicker sample S.

In FIG. 3, the index matching component 50 is disposed between the first splitter cube 220 and the sample S, but the present disclosure is not limited thereto. In some embodiments, the index matching component is not required in the optical interferometer 1, and the sample S is directly attached to the sampling surface 223 of the first splitter cube 220.

Figure 5:
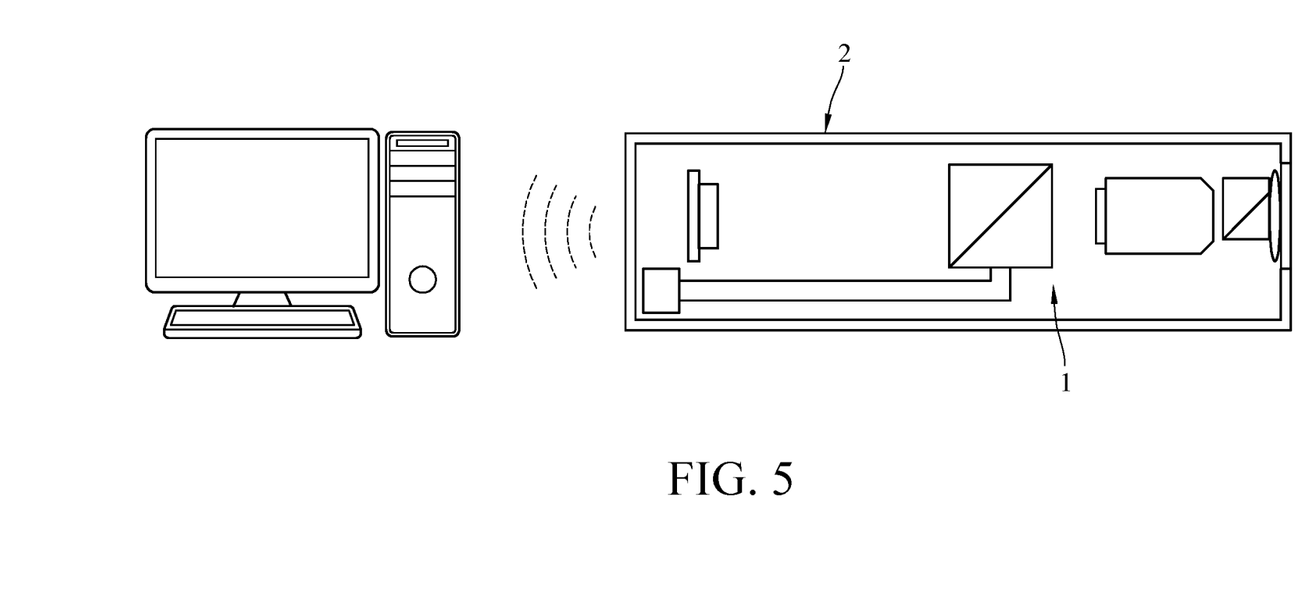
FIG. 5 is a schematic view of an optical coherence tomography instrument according to one embodiment of the present disclosure.

FIG. 5 is a schematic view of an optical coherence tomography instrument according to one embodiment of the present disclosure. According to one embodiment of the present disclosure, the optical interferometer 1 is applicable to an optical coherence tomography equipment 2. The optical coherence tomography equipment 2, for example, but not limited to, is an endoscopy such as gastroscopy or colonoscopy.

As to the application of the optical interferometer in the optical coherence tomography equipment, the resolution of an interference image is a factor for evaluating the effect of optical coherence tomography. Generally, in order to achieve high resolution of an interference image, a high Strehl ratio is necessary for both a reference light ray and a sample light ray along the optical axis of the lens assembly.

Figure 6:
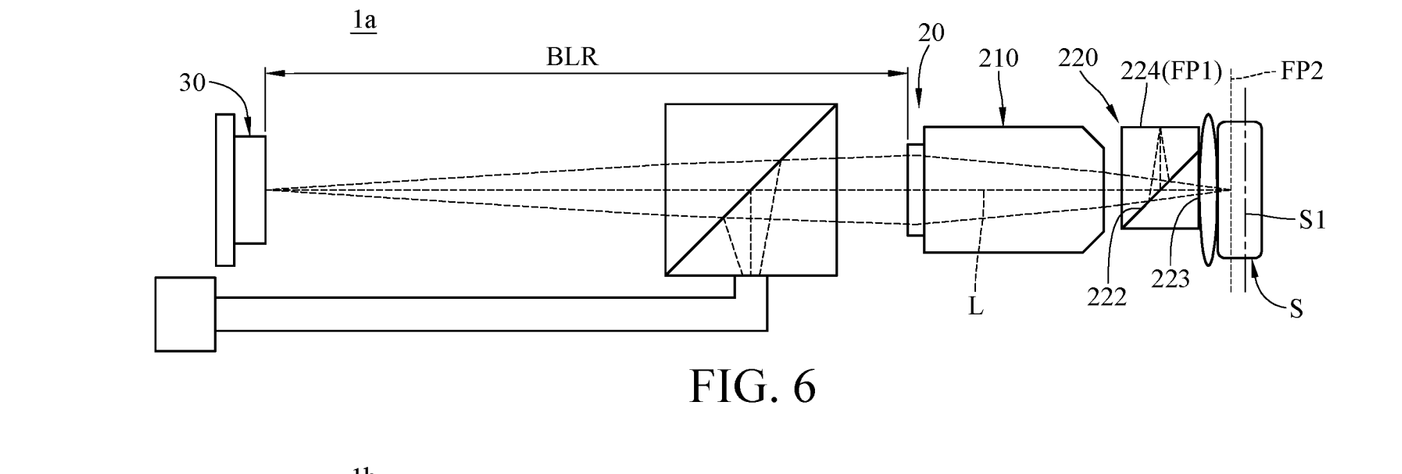
FIG. 6 is a schematic view of an optical interferometer with a reference light ray theoretical value of a back focal length according to one embodiment of the present disclosure.

FIG. 6 is a schematic view of an optical interferometer with a reference light ray theoretical value of a back focal length according to one embodiment of the present disclosure. In FIG. 6, the configuration of an optical interferometer 1a can be referred to that of the optical interferometer 1 in FIG. 1. The lens assembly 210 of the beam splitter module 20 of the optical interferometer 1a has a focal plane FP1 overlapping with the light reflecting surface 224 of the first splitter cube 220. That is, light passing through the lens assembly 210 is reflected by the light splitting surface 222 and then focuses on the light reflecting surface 224. At this time, a back focal length between the lens assembly 210 and the optical sensor 30 has a reference light ray theoretical value BLR. When the back focal length between the lens assembly 210 and the optical sensor 30 has the reference light ray theoretical value BLR, a focal plane FP2 of the lens assembly 210 does not overlap with the interference surface S1 of the sample S. Thus, a high Strehl ratio approaching 1.0 is obtained for the reference light ray along the optical axis L of the lens assembly 210, while a Strehl ratio of only 0.8387 is obtained for the sample light ray along the optical axis L of the lens assembly 210. The Strehl ratio is defined as a ratio of the peak intensity of the point spread function in the imperfect optical system to the peak intensity of the point spread function without aberrations in the ideal optical system.

Figure 7:
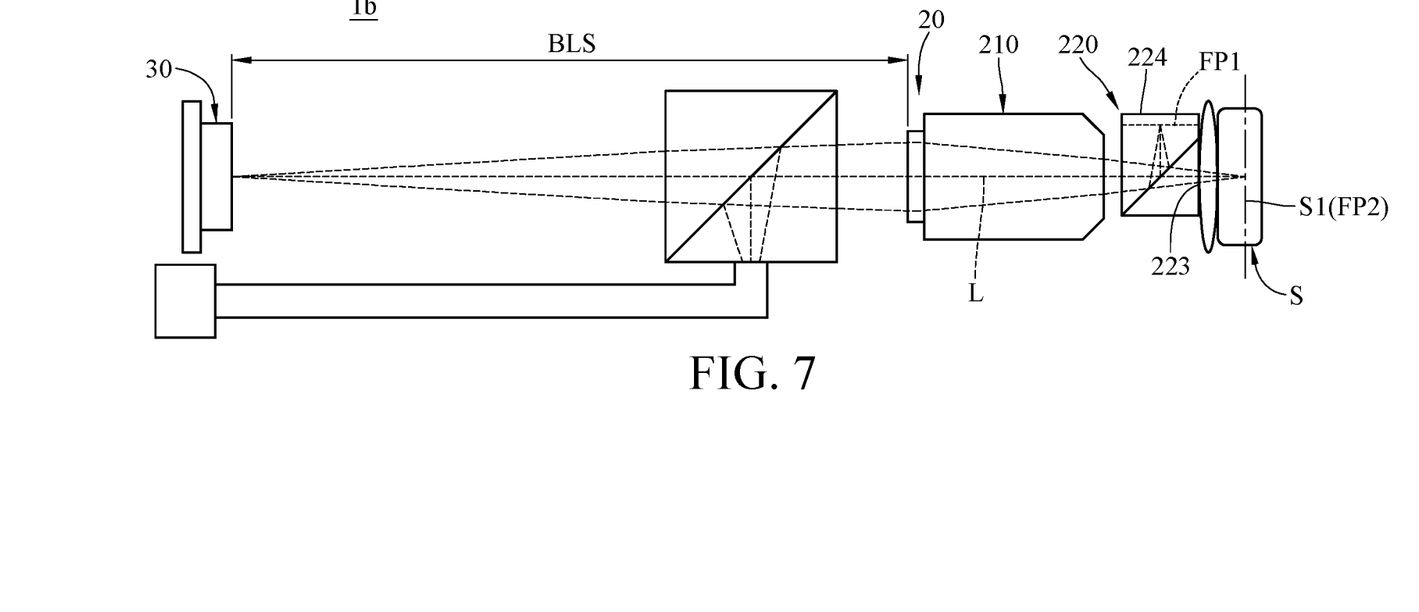
FIG. 7 is a schematic view of an optical interferometer with a sample light ray theoretical value of the back focal length according to one embodiment of the present disclosure.

FIG. 7 is a schematic view of an optical interferometer with a sample light ray theoretical value of the back focal length according to one embodiment of the present disclosure. In FIG. 7, the configuration of an optical interferometer 1b can be referred to that of the optical interferometer 1 in FIG. 1. The focal plane FP2 of the lens assembly 210 of the beam splitter module 20 in the optical interferometer 1b overlaps with the interference surface S1 of the sample S. That is, light passing through the lens assembly 210 and the sampling surface 223 focuses on the interference surface S1. At this time, a back focal length between the lens assembly 210 and the optical sensor 30 has a sample light ray theoretical value BLS. When the back focal length between the lens assembly 210 and the optical sensor 30 has the sample light ray theoretical value BLS, the focal plane FP1 of the lens assembly 210 does not overlap with the light reflecting surface 224 of the first splitter cube 220. Thus, a high Strehl ratio approaching 1.0 is obtained for the sample light ray along the optical axis L of the lens assembly 210, while a Strehl ratio of only 0.8283 is obtained for the reference light ray along the optical axis L of the lens assembly 210.

Figure 8:
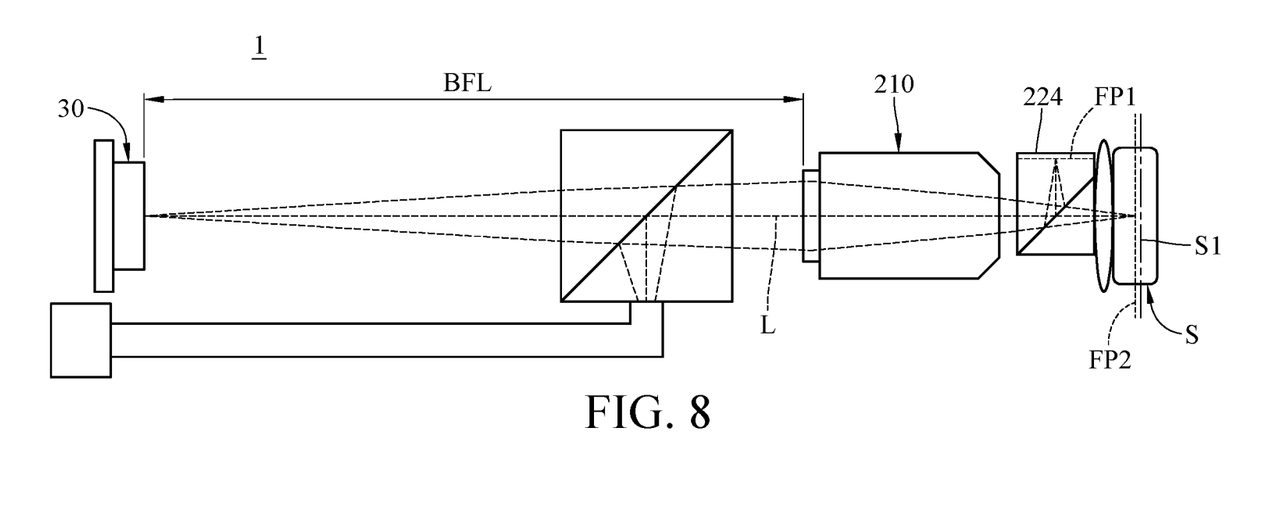
FIG. 8 is a schematic view of the optical path of the optical interferometer in FIG. 3.

FIG. 8 is a schematic view of the optical path of the optical interferometer in FIG. 3. To solve the problem mentioned in the above paragraphs, in one embodiment of the present disclosure, there is an actual back focal length BFL between the lens assembly 210 and the optical sensor 30. The actual back focal length BFL is between the sample light ray theoretical value BLS and the reference light ray theoretical value BLR. Therefore, even though the focal planes FP1 and FP2 of the lens assembly 210 do not overlap with the light reflecting surface 224 and the interference surface S1, respectively. This configuration is favorable and balanced for obtaining a proper Strehl ratio for the reference light ray and the sample light ray along the optical axis L of the lens assembly 210, thereby generating a high-quality interference image. In FIG. 8, a Strehl ratio of about 0.955 is obtained for the sample light ray along the optical axis L of the lens assembly 210. A Strehl ratio of about 0.956 is obtained for the reference light ray along the optical axis L of the lens assembly 210. In FIG. 6 through FIG. 8 show that the actual back focal length BFL is greater than the sample light ray theoretical value BLS (back focal length of sample light ray) and smaller than the reference light ray theoretical value BLR (back focal length of reference light ray) as an exemplary illustration. In one embodiment, the actual back focal length BFL is an arithmetic mean of the reference light ray theoretical value BLR and the sample light ray theoretical value BLS. That is, the following condition is satisfied: BFL=(BLS+BLR)/2. This condition is favorable for balancing the Strehl ratio for both the reference light ray and the sample light ray along the optical axis L of the lens assembly 210, thereby generating a high-quality interference image.

Figure 9:
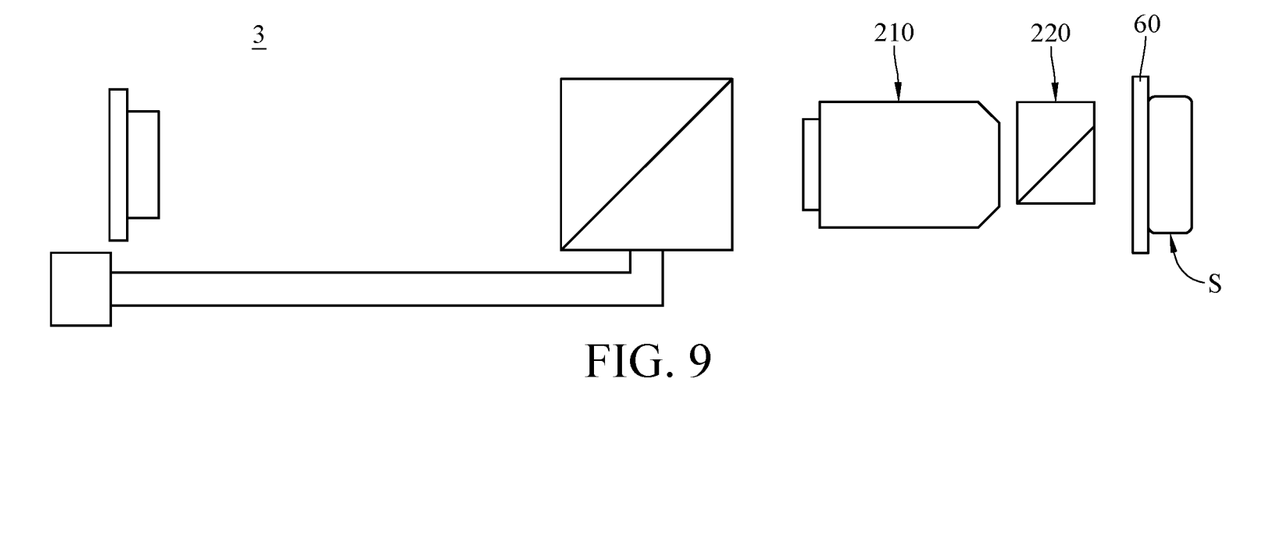
FIG. 9 is a schematic view of an optical interferometer according to another embodiment of the present disclosure.

FIG. 9 is a schematic view of an optical interferometer according to another embodiment of the present disclosure. Since the embodiment in FIG. 9 is similar to the embodiment in FIG. 1, only their difference will be illustrated hereafter. In this embodiment, an optical interferometer 3 does not include an index matching component but includes a cover glass 60. The cover glass 60 is disposed on a side of the first splitter cube 220 away from the lens assembly 210. The cover glass 60 is configured to isolate the optical interferometer 1 from the outside environment so as to prevent dust and the contact between the sample S and the first splitter cube 220. In this embodiment, the following condition is satisfied: n1×T1=n2×T2+n3×T3+n4×T4, wherein n4 is the refractive index of the cover glass 60, T4 is the thickness of the cover glass 60. The refractive index of the first splitter cube 220 is n1, the refractive index of the air gap (index matching component) is n2, the refractive index of the sample S is n3, the distance between the light splitting surface 222 and the light reflecting surface 224 of the first splitter cube 220 is T1, the width of the air gap is T2, and the scannable depth of the sample S is T3.

Figure 10:
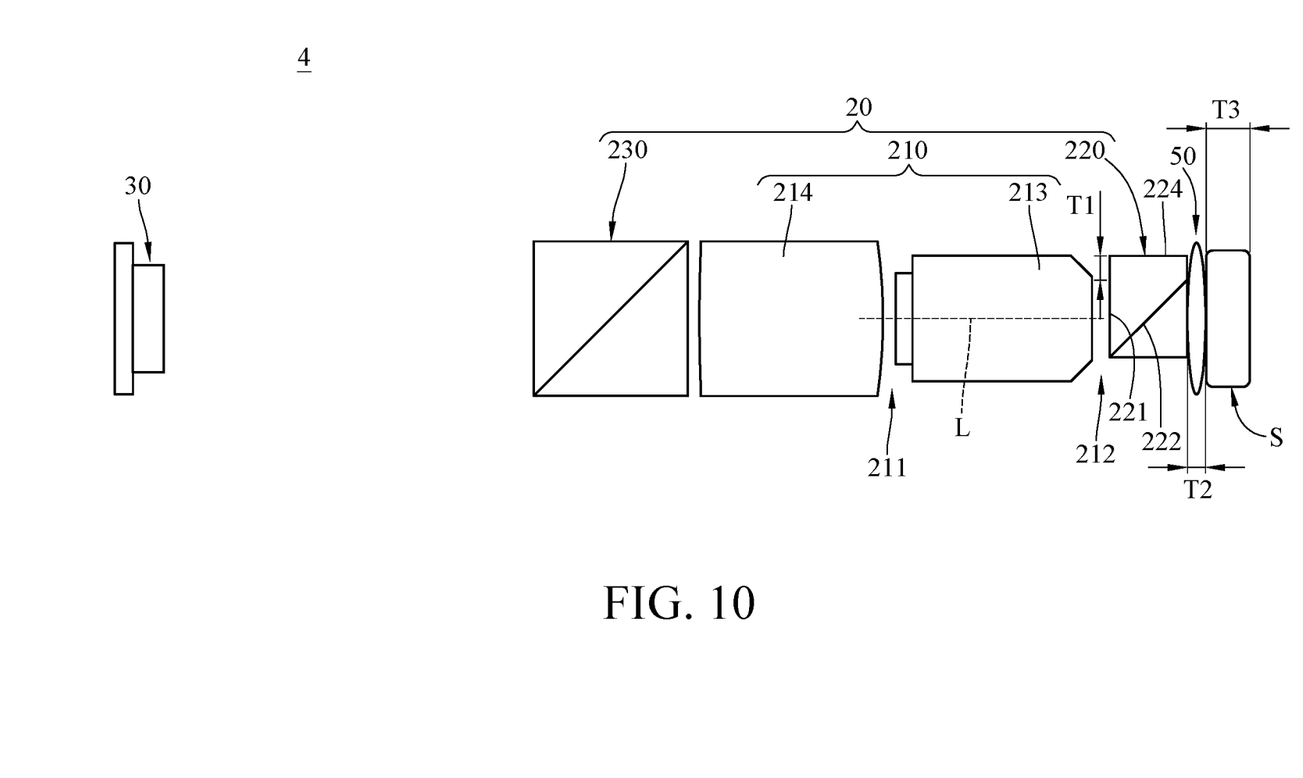
FIG. 10 is a schematic view of an optical interferometer according to yet another embodiment of the present disclosure.

FIG. 10 is a schematic view of an optical interferometer according to yet another embodiment of the present disclosure. Since the embodiment in FIG. 10 is similar to the embodiment in FIG. 1, only their difference will be illustrated hereafter. In this embodiment, the lens assembly 210 of the beam splitter module 20 of an optical interferometer 4 includes a focusing objective lens 213 and a tube lens 214, which are arranged along the optical axis L. The optical interferometer 4 further includes a light source (not shown in the drawings) for providing light into the second splitter cube 230.

The light incident surface 221 of the first splitter cube 220 of the beam splitter module 20 faces the focusing objective lens 213 and is orthogonal to the optical axis L. The tube lens 214 is disposed between the focusing objective lens 213 and the second splitter cube 230. The first splitter cube 220 is disposed between the index matching component 50 and the focusing objective lens 213, and the second splitter cube 230 is disposed between the optical sensor 30 and the tube lens 214.

Both the focusing objective lens 213 and the tube lens 214 is a single lens element or a plurality of lens elements. The tube lens 214 works with the focusing objective lens 213 to correct chromatic aberration and distortion generated by the focusing objective lens 213. As well, the tube lens 214 enlarges the field of view of the focusing objective lens 213.

In this embodiment, the first splitter cube 220 is made of glass with the refractive index (n1) of 1.4. The index matching component 50 is an air gap with the refractive index (n2) of 1.0. The refractive index (n3) of the sample S is 1.4.

According to one embodiment of the present disclosure, the first splitter cube 220 of the beam splitter module 20 is movable relative to the lens assembly 210 along the optical axis L. In detail, the optical interferometer 4 can include a linear motion stage (not shown in the drawings). The first splitter cube 220 is supported on the linear motion stage and can be moved relative to the lens assembly 210 and the sample S along the optical axis L by the linear motion stage. Thus, a gap between the first splitter cube 220 and the sample S is adjustable by moving the first splitter cube 220 for accommodating index matching components 50 having different thicknesses. As such, the scannable depth T3 of the sample S is changeable by adjusting the thickness T2 of the index matching component 50. In some embodiments, the sample S can be supported on the linear motion stage so as to be movable by the linear motion stage, and the optical interferometer 4 is able to scan the cross-sections of the sample S in different depths by moving the sample S.

In FIG. 10, the distance T1 between the light splitting surface 222 and the light reflecting surface 224 of the first splitter cube 220 is 0.5 millimeter (mm). The first splitter cube 220 is disposed on the linear motion stage to be movable between the focusing objective lens 213 and the sample S. The following condition can be satisfied by moving the first splitter cube 220: n1×T1=n2×T2+n3×T3. The thickness T2 of the index matching component 50 has an adjustable range from 0 mm to 0.36 mm, and thus the scannable depth T3 of the sample S has an adjustable range from 0 mm to 0.50 mm.

According to the present disclosure, a reference arm is defined between the splitter position on the light splitting surface and the light reflecting surface, a sample arm is defined between the splitter position and the sampling surface, and the reference arm is longer than the sample arm. Therefore, both the reference arm and the sample arm are located in the same splitter cube and share the same lens assembly, such that it is favorable for reducing components in the optical interferometer so as to make the optical interferometer compact in size as well as reducing manufacturing costs.

Furthermore, an actual back focal length between the lens assembly and the optical sensor has an actual value, which ranges between a reference light ray theoretical value and a sample light ray theoretical value. Therefore, it is favorable for balancing the Strehl ratio for both the reference light ray and the sample light ray along the optical axis of the lens assembly, thereby generating a high-quality interference image.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An optical interferometer, comprising:
a beam splitter module comprising a lens assembly and a first splitter element, the first splitter element being disposed on a sample side of the lens assembly, the first splitter cube comprising a light incident surface, a light splitting surface, a sampling surface, and a light reflecting surface, the light incident surface of the first splitter element being substantially orthogonal to an optical axis of the lens assembly, an acute angle being between the light incident surface and the light splitting surface, the sampling surface being substantially parallel to the light incident surface, the light reflecting surface being substantially orthogonal to the light incident surface, and the light incident surface being closer to the lens assembly than the sampling surface; and
an optical sensor disposed on a signal receiving side of the lens assembly;
wherein a reference arm is defined between a splitter position on the light splitting surface and the light reflecting surface, a sample arm is defined between the splitter position and the sampling surface, and the reference arm is longer than the sample arm;
wherein a reference light ray theoretical value of a back focal length is defined when a focal plane of the lens assembly overlaps with the light reflecting surface of the first splitter cube, a sample light ray theoretical value of the back focal length is defined when the focal plane of the lens assembly overlaps with an interference plane of a sample to be tested, and an actual back focal length ranges between the reference light ray theoretical value and the sample light ray theoretical value;
wherein two focal planes of the lens assembly, which respectively correspond reference light ray and sample light ray, do not overlap with the light reflecting surface and the interference surface.

2. The optical interferometer according to claim 1, wherein the first splitter cube of the beam splitter module is movable relative to the lens assembly along the optical axis.

3. The optical interferometer according to claim 1, wherein the first splitter cube of the beam splitter module comprises a triangular prism and a trapezoidal prism connected with each other, the triangular prism and the trapezoidal prism jointly form the light splitting surface of the first splitter cube, the triangular prism has the sampling surface of the first splitter cube, and the trapezoidal prism has the light incident surface and the light reflecting surface of the first splitter cube.

4. The optical interferometer according to claim 1, further comprising an index matching component, wherein the first splitter cube is disposed between the index matching component and the lens assembly.

5. The optical interferometer according to claim 4, wherein a refractive index of the first splitter cube is n1, a refractive index of the index matching component is n2, a refractive index of a sample to be tested is n3, a distance between the light splitting surface and the light reflecting surface is T1, a thickness of the index matching component is T2, a scannable depth of the sample is T3, and the following condition is satisfied:

$n1 \times T1 = n2 \times T2 + n3 \times T3.$

6. The optical interferometer according to claim 1, wherein the beam splitter module further comprises a second splitter cube disposed between the lens assembly and the optical sensor.

7. The optical interferometer according to claim 1, wherein a Strehl ratio for reference light ray along the optical axis is smaller than 1.0 and larger than 0.8283, and a Strehl ratio for sample light ray along the optical axis is smaller than 1.0 and larger than 0.8387.

8. The optical interferometer according to claim 1, wherein the actual back focal length is an arithmetic mean of the reference light ray theoretical value and the sample light ray theoretical value.

9. The optical interferometer according to claim 1, wherein the optical interferometer is a Michelson interferometer.

10. An optical interferometer, comprising:
a beam splitter module, comprising:
a first splitter element, comprising a light incident surface, a light splitting surface, a sampling surface, and a light reflecting surface, an acute angle being between the light incident surface and the light splitting surface, the sampling surface being substantially parallel to the light incident surface, and the light reflecting surface being substantially orthogonal to the light incident surface;
a lens assembly comprising a focusing objective lens and a tube lens which are arranged along an optical axis of the lens assembly, the light incident surface of the first splitter element facing the focusing objective lens, and the light incident surface being substantially orthogonal to the optical axis; and
a second splitter element, the tube lens being disposed between the focusing objective lens and the second splitter element;
an index matching component adjacent to the sampling surface of the first splitter element, the first splitter element being disposed between the index matching component and the focusing objective lens; and
an optical sensor, the second splitter element being disposed between the optical sensor and the tube lens, wherein a reference light ray theoretical value of a back focal length is defined when a focal plane of the lens assembly overlaps with the light reflecting surface of the first splitter cube, a sample light ray theoretical value of the back focal length is defined when the focal plane of the lens assembly overlaps with an interference plane of a sample to be tested, and an actual back focal length ranges between the reference light ray theoretical value and the sample light ray theoretical value.

11. The optical interferometer according to claim 10, wherein a reference arm is defined between a splitter position on the light splitting surface and the light reflecting surface, a sample arm is defined between the splitter position and the sampling surface, and the reference arm is longer than the sample arm.

12. The optical interferometer according to claim 10, wherein the first splitter cube of the beam splitter module is movable relative to the lens assembly along the optical axis.

13. The optical interferometer according to claim 10, wherein the first splitter cube of the beam splitter module comprises a triangular prism and a trapezoidal prism connected with each other, the triangular prism and the trapezoidal prism jointly form the light splitting surface of the first splitter cube, the triangular prism has the sampling surface of the first splitter cube, and the trapezoidal prism has the light incident surface and the light reflecting surface of the first splitter cube.

14. The optical interferometer according to claim 10, wherein each of the focusing objective lens and the tube lens is a single lens element or a plurality of lens elements.

15. The optical interferometer according to claim 10, wherein the optical interferometer is a Michelson interferometer.

16. The optical interferometer according to claim 10, wherein the index matching component is glycerol, silicone oil or air.

* * * * *